F. SMILEY.
Treadles for Sewing-Machines.
No. 141,240. Patented July 29, 1873.
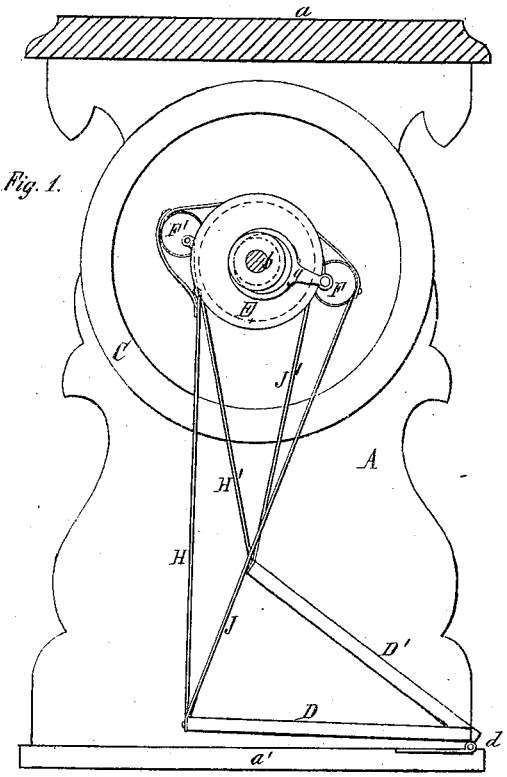
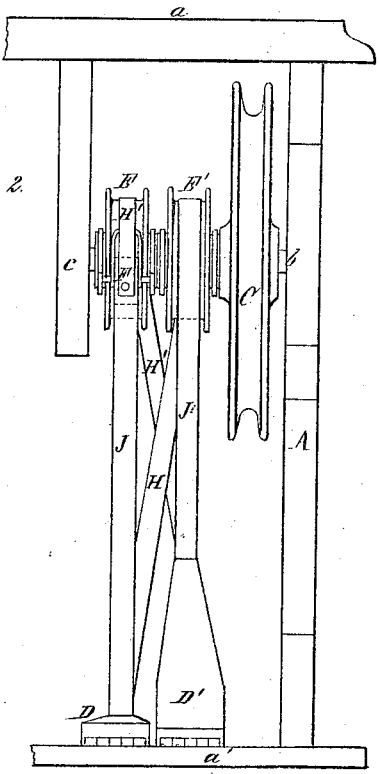
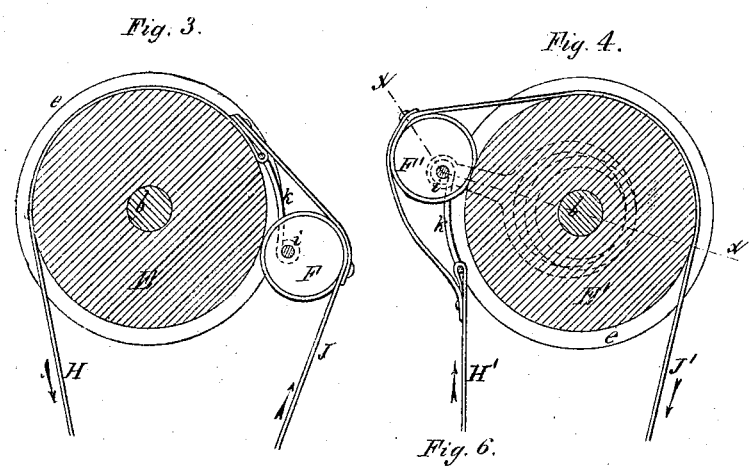
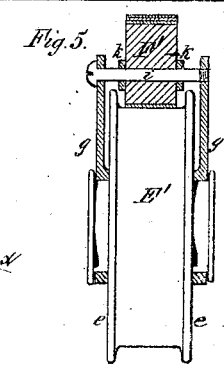
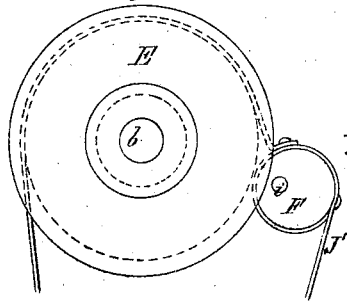
Edward Wilhelm
John J. Bonner
*Witnesses.*
Frank Smiley *Inventor*
by Jay Hyatt
*Atty.*

UNITED STATES PATENT OFFICE.

FRANK SMILEY, OF BATAVIA, NEW YORK.

IMPROVEMENT IN TREADLES FOR SEWING-MACHINES.

Specification forming part of Letters Patent No. 141,240, dated July 29, 1873; application filed March 26, 1873.

*To all whom it may concern:*

Be it known that I, FRANK SMILEY, of Batavia, in the county of Genesee and State of New York, have invented certain Improvements in Treadles for Sewing - Machines, of which the following is a specification:

The invention consists, first, in the combination, with two alternately-operated treadles and a smooth double wheel or pulley mounted on the spindle or shaft to be driven, of two friction cams or clutches arranged in contact with the surface of the wheel, and pivoted in bearings turning loosely on the spindle or hub of the wheel, and actuating and reversing straps connecting each cam with both treadles, whereby the downward movement of either treadle will, by means of its actuating-strap, press one of the clamps tightly against the surface of the wheel and rotate the same, while its reversing-strap will release the other clamp and bring it to its proper position to be engaged with the wheel by the second treadle, which is now depressed, and by which the wheel is turned, and the first cam released and reversed—ready for a second downward movement of the first treadle and a repetition of the operation; second, in the combination, in the above mechanical movement, of a bearing for the friction-clamps, composed of two radial arms turning loosely on the shaft or hubs of the wheels and receiving the pivots of the clamps, whereby each clamp is held in its proper position outside of the face of the wheel with which it engages, and compelled to travel in the plane of the wheel concentric therewith.

In the accompanying drawing, Figure 1 is a side elevation, and Fig. 2 a front elevation, of my improved mechanical movement applied to a sewing - machine. Figs. 3 and 4 represent the two friction-clamps in opposite positions. Fig. 5 is a vertical section in line $x$ $x$, Fig. 4. Fig. 6 shows a modified manner of connecting the reversing - strap with the clamps.

Like letters of reference designate like parts in each of the figures.

A represents the side frame of a sewing-machine; $a$ the top, and $a'$ the base thereof. $b$ is the spindle, supported at one end in the frame A, and at the other end in a pendent bearing, $c$, and carrying the fly-wheel C. D D' represent the two treadles pivoted to the base-piece, as shown at $d$. E E' represent two smooth wheels or pulleys tightly secured to the spindle $b$, so as to turn together, and preferably provided with flanges $e$ to keep the straps in place. F F' are two friction clutches or clamps, in the shape of rollers, provided with eccentric pivots. $g$ $g$ are radial arms or bearings loosely fitting on either side of each pulley. $i$ is the pivot connecting each pair of arms, and passing eccentrically through the respective cam, as clearly shown. J J' are the two actuating-straps, secured respectively to the outer ends of the cams F F', and connecting with the treadles D D'. H H' are the two reversing-straps, the former fastened to the cam F', and passing, on the opposite side of the pulley from the actuating-strap, to the treadle D, while the latter H' connects the cam and pulley F E with the treadle D' in a similar manner.

From the above description it is obvious that, as one treadle is depressed, the actuating-strap thereof will swing the cam, with which such strap connects, on its pivot and cause it to engage with and clutch the wheel and set it in motion, while the same movement of the treadle releases and reverses the other cam preparatory to operating the second treadle, the depression of which simply repeats with the second cam the operation of the first.

The clamps F F' are preferably covered with thin leather, or similar material, to prevent them from slipping on the pulley in being tightened thereon.

The reversing-straps may be attached to the cams, as shown in Figs. 1 and 4, and with a bail, $k$, extending from the pivots of the cams. This bail operates to prevent the reversing-strap from turning the cam backward on its pivot sufficiently far to cause it to engage with and clamp the pulley. This bail $k$ is, however, not absolutely essential.

By attaching the reversing - straps to the pulleys at a point nearer the pivot, as shown in Fig. 6, the cam will be turned backward on its pivot by the reversing-strap only a sufficient distance to properly release it from engagement with the wheel.

My improved mechanical movement is cheap of construction, and works with comparatively little noise.

What I claim as my invention is—

1. The combination, with two alternately-operated treadles and the shaft or spindle to be rotated, provided with a double smooth-faced wheel or pulley, of the two friction clutches or clamps and supporting-arms, and actuating and reversing straps, substantially as and for the purpose hereinbefore set forth.

2. In a machine constructed substantially as hereinbefore set forth, the radial arms $g\ g$, adapted to serve as the pivot-bearings for the friction-clutches, and operating as and for the purposes described.

FRANK SMILEY.

Witnesses:
 JNO. J. BONNER,
 EDWARD WILHELM.